US007895254B2

(12) United States Patent
Ketchum et al.

(10) Patent No.: US 7,895,254 B2
(45) Date of Patent: Feb. 22, 2011

(54) EIGENVALUE DECOMPOSITION AND SINGULAR VALUE DECOMPOSITION OF MATRICES USING JACOBI ROTATION

(75) Inventors: John W. Ketchum, Harvard, MA (US); Jay Rodney Walton, Carlisle, MA (US); Mark S. Wallace, Bedford, MA (US); Steven J. Howard, Ashland, MA (US); Hakan Inanoglu, Acton, MA (US)

(73) Assignee: Qualcomm Incorporated, San Diego, CA (US)

( * ) Notice: Subject to any disclaimer, the term of this patent is extended or adjusted under 35 U.S.C. 154(b) by 1214 days.

(21) Appl. No.: 11/280,596

(22) Filed: Nov. 15, 2005

(65) Prior Publication Data

US 2006/0155798 A1 Jul. 13, 2006

Related U.S. Application Data

(60) Provisional application No. 60/628,324, filed on Nov. 15, 2004, provisional application No. 60/628,440, filed on Nov. 15, 2004.

(51) Int. Cl.
G06F 7/32 (2006.01)

(52) U.S. Cl. ...................................... 708/520
(58) Field of Classification Search ............... 708/520
See application file for complete search history.

(56) References Cited

U.S. PATENT DOCUMENTS

| 6,859,747 | B2 | 2/2005 | Yutkowitz |
| 7,065,144 | B2 | 6/2006 | Walton et al. |
| 7,298,805 | B2 | 11/2007 | Walton et al. |
| 7,327,800 | B2 | 2/2008 | Oprea et al. |

(Continued)

FOREIGN PATENT DOCUMENTS

RU 2005115862 1/2006

(Continued)

OTHER PUBLICATIONS

Giacomantone, Javier Oscar.: "Tradeoffs in Arithmetic Architectures for CORDIC Algorithm Design." pp. 1-9, CeTAD—Fac. De Ingenieria—UNLP.

(Continued)

*Primary Examiner*—Tan V Mai
(74) *Attorney, Agent, or Firm*—Qualcomm Patent Group; Dmitry R. Milikovsky; James H. Yancey, Jr.

(57) ABSTRACT

Techniques for decomposing matrices using Jacobi rotation are described. Multiple iterations of Jacobi rotation are performed on a first matrix of complex values with multiple Jacobi rotation matrices of complex values to zero out the off-diagonal elements in the first matrix. For each iteration, a submatrix may be formed based on the first matrix and decomposed to obtain eigenvectors for the submatrix, and a Jacobi rotation matrix may be formed with the eigenvectors and used to update the first matrix. A second matrix of complex values, which contains orthogonal vectors, is derived based on the Jacobi rotation matrices. For eigenvalue decomposition, a third matrix of eigenvalues may be derived based on the Jacobi rotation matrices. For singular value decomposition, a fourth matrix with left singular vectors and a matrix of singular values may be derived based on the Jacobi rotation matrices.

36 Claims, 6 Drawing Sheets

U.S. PATENT DOCUMENTS

| | | | |
|---|---|---|---|
| 7,539,253 | B2 | 5/2009 | Li et al. |
| 2002/0127978 | A1 | 9/2002 | Khatri |
| 2003/0033105 | A1* | 2/2003 | Yutkowitz .................. 702/105 |
| 2003/0218973 | A1* | 11/2003 | Oprea et al. ............... 370/210 |
| 2003/0235255 | A1 | 12/2003 | Ketchum et al. |
| 2005/0047515 | A1 | 3/2005 | Walton et al. |
| 2005/0267925 | A1* | 12/2005 | Clue ......................... 708/400 |
| 2006/0056531 | A1 | 3/2006 | Li et al. |
| 2006/0067277 | A1 | 3/2006 | Thomas et al. |
| 2006/0106902 | A1 | 5/2006 | Howard et al. |
| 2006/0285531 | A1 | 12/2006 | Howard et al. |
| 2007/0249296 | A1 | 10/2007 | Howard et al. |

FOREIGN PATENT DOCUMENTS

| | | |
|---|---|---|
| WO | 2005114868 | 12/2005 |

OTHER PUBLICATIONS

Gotze, J., et al., "An Algorithm and Architecture Based on Orthonormal Mu-Rotations for Computing the Symmetric EVD" Integration, The VLSI Journal, North-Holland Publishing Company. Amsterdam, NL, vol. 20, No. 1, Dec. 1, 1995, pp. 21-39.

Griffin, Grant R., "Cordic FAQ," Iowegian's dspGuru. pp. 1-6.

Hemkumar N. D., et al. "Efficient Complex Matrix Transformations with CORDIC" Computer Arithmetic, 1994. Proceedings., 11th Symposium on Windsor, Ont., Canada Jun. 29-Jul. 2, 1993, Los Alamitos, CA, USA, IEEE Comput. Soc, Jun. 29, 1993, pp. 122-129.

Hsiao, S. et al.: "Parallel Singular Value Decomposition of Complex Matrices Using Multidimensional CORDIC Algorithms" IEEE Transactions of Signal Processing, IEEE Service Center, New York, NY, UA, vol. 44, No. 3, pp. 685-697, Mar. 1, 1996.

Kim, M. et al.: "Design of Jacobi EVD Processor Based on CORDIC for DOA Estimation with MUSIC Algorithm." Personal, Indoor, and Mobile Radio Communications, pp. 120-124, The 13th IEEE International Symposium on Sep. 15-18, 2002, Piscataway, NJ, USA, IEEE.

Michalke C et al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C, pp. 2847-2851, XP010678152.

Nowak, et al., "An Efficient Implementation of a 256-point FFT Processor with CORDIC for OFDM Systems," Delft University of Technology, Faculty of Information Technology and Systems Circuits and Systems Group, pp. 427-434, ISBN: 90-73461-15-4. 1998. STW, 1998 1026-01.

Oksa G et al: "Multi-level parallelism in the block-jacobi SVD algorithm" Parallel and Distribution Processing, 2001. Proceedings. Ninth Euromicr O Workshop. IEEE. Feb. 7, 2001, pp. 306-313, XP010532138, ISBN: 978-0-7695-0987-7.

Schafer, F. et al.: Efficient Tracking of Eigenspaces and its application to MIMO systems Proceedings of the IST Mobile and Wireless Communications Summit, Jun. 18, 2003, pp. 1-6, XP002478514.

Seeger, R. et al.: "Advanced Eigenbeamforming for the 3GPP UMTS FDD Downlink" ITG IEEE Workshop on Smart Antennas, XX, XX, Apr. 4, 2004, pp. 1-8, XP002468805, Section III.

International Search Report -PCT/US2005/041783, International Search Authority—European Patent Office—Jun. 12, 2008.

International Preliminary Report on Patentability -PCT/US2005/041783, International Search Authority- The International Bureau of WIPO, Geneva, Switzerland- Jun. 24, 2008.

Written Opinion-PCT/US2005/041783, International Search Authority- European Patent Office—Jun. 12, 2008.

Bello: "Characterization of Randomly Time-Variante Linear Channels," Communications Systems, IEEE transactions on, vol. 11, Issue 4, pp. 360-393, Dec. 1963.

Choi, et al.: "Interpolation Based Transmit Beamforming for MIMO-OFDM with Limited Feedback," 2004 IEEE International Conference in Paris, France, pp. 249-253, Jun. 20, 2004.

Gilbert, et al., "Linear algebra and matrix theory", Academic Press Inc, ISBN 0-12-282970-0, Dec. 31, 1995.

Griffin, Grant R., "Cordic FAQ," Iowegian's dspGuru. pp. 1-6.

* cited by examiner

EIGENVALUE DECOMPOSITION AND SINGULAR VALUE DECOMPOSITION OF MATRICES USING JACOBI ROTATION

I. CLAIM OF PRIORITY UNDER 35 U.S.C. §119

The present Application for Patent claims priority to Provisional Application Ser. No. 60/628,324, entitled "Eigenvalue Decomposition and Singular Value Decomposition of Matrices Using Jacobi Rotation," filed Nov. 15, 2004 and Provisional Application No. 60/628,440, entitled "EIGENVALUE Decomposition and Singular Value Decomposition of Matrices Using Jacobi Rotation," filed Nov. 15, 2004, assigned to the assignee hereof, and hereby expressly incorporated by reference herein.

BACKGROUND

I. Field

The present invention relates generally to communication, and more specifically to techniques for decomposing matrices.

II. Background

A multiple-input multiple-output (MIMO) communication system employs multiple (T) transmit antennas at a transmitting station and multiple (R) receive antennas at a receiving station for data transmission. A MIMO channel formed by the T transmit antennas and the R receive antennas may be decomposed into S spatial channels, where $S \leq \min\{T, R\}$. The S spatial channels may be used to transmit data in a manner to achieve higher overall throughput and/or greater reliability.

A MIMO channel response may be characterized by an R×T channel response matrix H, which contains complex channel gains for all of the different pairs of transmit and receive antennas. The channel response matrix H may be diagonalized to obtain S eigenmodes, which may be viewed as orthogonal spatial channels of the MIMO channel. Improved performance may be achieved by transmitting data on the eigenmodes of the MIMO channel.

The channel response matrix H may be diagonalized by performing either singular value decomposition of H or eigenvalue decomposition of a correlation matrix of H. The singular value decomposition provides left and right singular vectors, and the eigenvalue decomposition provides eigenvectors. The transmitting station uses the right singular vectors or the eigenvectors to transmit data on the S eigenmodes. The receiving station uses the left singular vectors or the eigenvectors to receive data transmitted on the S eigenmodes.

Eigenvalue decomposition and singular value decomposition are very computationally intensive. There is therefore a need in the art for techniques to efficiently decompose matrices.

SUMMARY

Techniques for efficiently decomposing matrices using Jacobi rotation are described herein. These techniques may be used for eigenvalue decomposition of a Hermitian matrix of complex values to obtain a matrix of eigenvectors and a matrix of eigenvalues for the Hermitian matrix. The techniques may also be used for singular value decomposition of an arbitrary matrix of complex values to obtain a matrix of left singular vectors, a matrix of right singular vectors, and a matrix of singular values for the arbitrary matrix.

In an embodiment, multiple iterations of Jacobi rotation are performed on a first matrix of complex values with multiple Jacobi rotation matrices of complex values to zero out the off-diagonal elements in the first matrix. The first matrix may be a channel response matrix H, a correlation matrix of H, which is R, or some other matrix. For each iteration, a submatrix may be formed based on the first matrix and decomposed to obtain eigenvectors for the submatrix, and a Jacobi rotation matrix may be formed with the eigenvectors and used to update the first matrix. A second matrix of complex values is derived based on the Jacobi rotation matrices. The second matrix contains orthogonal vectors and may be a matrix $V_i$ of right singular vectors of H or eigenvectors of R.

For eigenvalue decomposition, a third matrix $D_i$ of eigenvalues may be derived based on the Jacobi rotation matrices. For singular value decomposition (SVD) based on a first SVD embodiment, a third matrix $W_i$ of complex values may be derived based on the Jacobi rotation matrices, a fourth matrix $\hat{U}$ with orthogonal vectors may be derived based on the third matrix $W_i$, and a matrix $\hat{\Sigma}$ of singular values may also be derived based on the third matrix $W_i$. For singular value decomposition based on a second SVD embodiment, a third matrix $U_i$ with orthogonal vectors and a matrix $\hat{\Sigma}$ of singular values may be derived based on the Jacobi rotation matrices.

Various aspects and embodiments of the invention are described in further detail below.

DETAILED DESCRIPTION

Figure 1:
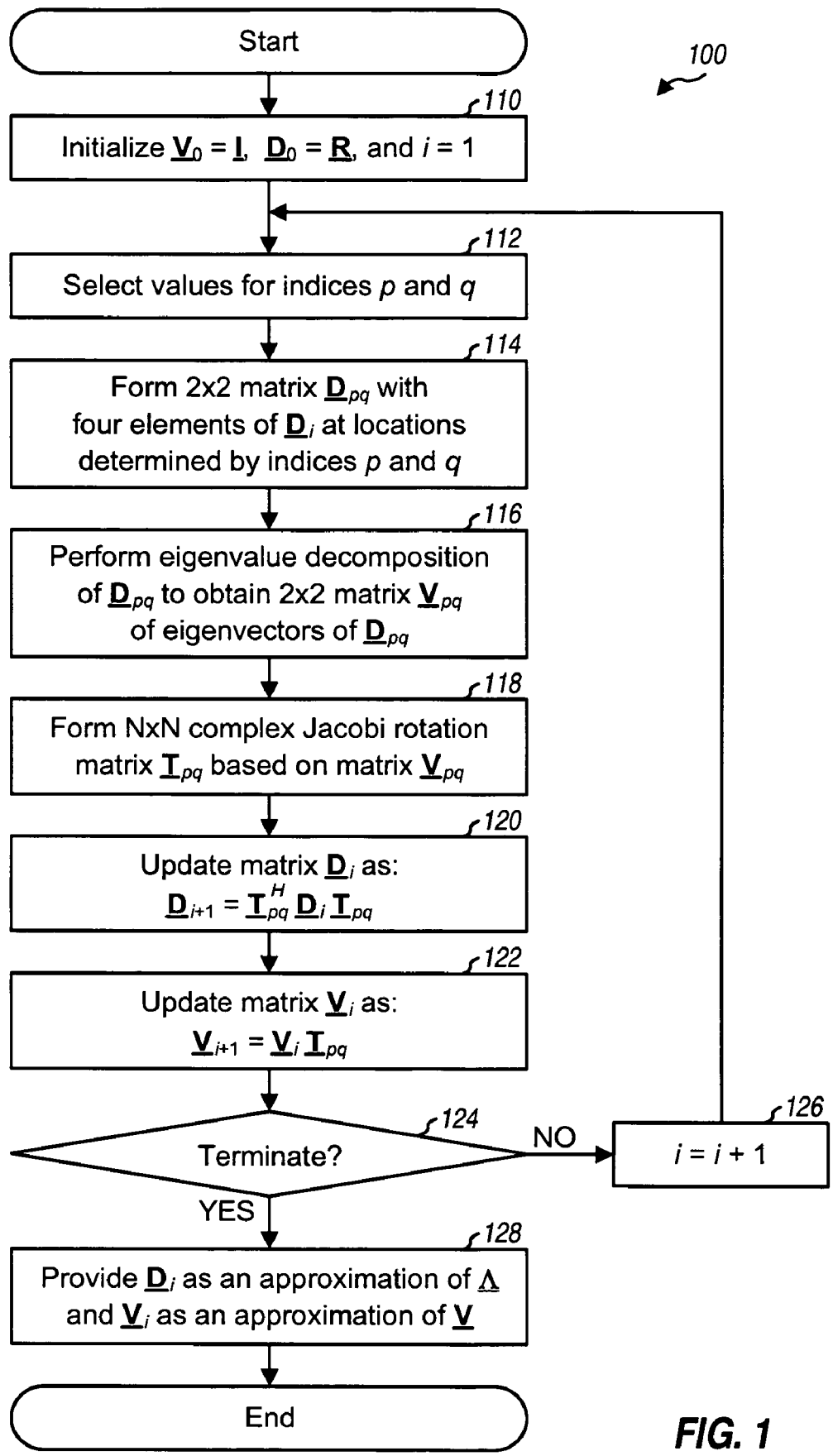
FIG. 1 shows a process for performing eigenvalue decomposition using Jacobi rotation.

The word "exemplary" is used herein to mean "serving as an example, instance, or illustration." Any embodiment described herein as "exemplary" is not necessarily to be construed as preferred or advantageous over other embodiments.

The matrix decomposition techniques described herein may be used for various communication systems such as a single-carrier communication system with a single frequency subband, a multi-carrier communication system with multiple subbands, a single-carrier frequency division multiple access (SC-FDMA) system with multiple subbands, and other communication systems. Multiple subbands may be obtained with orthogonal frequency division multiplexing (OFDM), some other modulation techniques, or some other construct. OFDM partitions the overall system bandwidth into multiple (K) orthogonal subbands, which are also called tones, subcarriers, bins, and so on. With OFDM, each subband is associated with a respective subcarrier that may be modulated with data. An SC-FDMA system may utilize interleaved FDMA (IFDMA) to transmit on subbands that are distributed across the system bandwidth, localized FDMA (LFDMA) to transmit on a block of adjacent subbands, or enhanced FDMA (EFDMA) to transmit on multiple blocks of adjacent subbands. In general, modulation symbols are sent in the frequency domain with OFDM and in the time domain with SC-FDMA. For clarity, much of the following description is for a MIMO system with a single subband.

A MIMO channel formed by multiple (T) transmit antennas and multiple (R) receive antennas may be characterized by an R×T channel response matrix H, which may be given as:

$$H = \begin{bmatrix} h_{1,1} & h_{1,2} & \cdots & h_{1,T} \\ h_{2,1} & h_{2,2} & \cdots & h_{2,T} \\ \vdots & \vdots & \ddots & \vdots \\ h_{R,1} & h_{R,2} & \cdots & h_{R,T} \end{bmatrix}, \quad \text{Eq (1)}$$

where entry $h_{i,j}$, for $i=1, \ldots, R$ and $j=1, \ldots, T$, denotes the coupling or complex channel gain between transmit antenna j and receive antenna i.

The channel response matrix H may be diagonalized to obtain multiple (S) eigenmodes of H, where $S \leq \min\{T, R\}$. The diagonalization may be achieved by, for example, performing either singular value decomposition of H or eigenvalue decomposition of a correlation matrix of H.

The eigenvalue decomposition may be expressed as:

$$R = H^H \cdot H = V \cdot \Lambda \cdot V^H, \quad \text{Eq (2)}$$

where R is a T×T correlation matrix of H;

V is a T×T unitary matrix whose columns are eigenvectors of R;

Λ is a T×T diagonal matrix of eigenvalues of R; and

"$H$" denotes a conjugate transpose.

The unitary matrix V is characterized by the property $V^H \cdot V = I$, where I is the identity matrix. The columns of the unitary matrix are orthogonal to one another, and each column has unit power. The diagonal matrix Λ contains possible non-zero values along the diagonal and zeros elsewhere. The diagonal elements of Λ are eigenvalues of R. These eigenvalues are denoted as $\{\lambda_1, \lambda_2, \ldots, \lambda_S\}$ and represent the power gains for the S eigenmodes. R is a Hermitian matrix whose off-diagonal elements have the following property: $r_{i,j} = r^*_{j,i}$, where "*" denotes a complex conjugate.

The singular value decomposition may be expressed as:

$$H = U \cdot \Sigma \cdot V^H, \quad \text{Eq(3)}$$

where U is an R×R unitary matrix of left singular vectors of H;

Σ is an R×T diagonal matrix of singular values of H; and

V is a T×T unitary matrix of right singular vectors of H.

U and V each contain orthogonal vectors. Equations (2) and (3) indicate that the right singular vectors of H are also the eigenvectors of R. The diagonal elements of Σ are the singular values of H. These singular values are denoted as $\{\sigma_1, \sigma_2, \ldots, \sigma_S\}$ and represent the channel gains for the S eigenmodes. The singular values of H are also the square roots of the eigenvalues of R, so that $\sigma_i = \sqrt{\lambda_i}$ for $i=1, \ldots, S$.

A transmitting station may use the right singular vectors in V to transmit data on the eigenmodes of H. Transmitting data on eigenmodes typically provides better performance than simply transmitting data from the T transmit antennas without any spatial processing. A receiving station may use the left singular vectors in U or the eigenvectors in V to receive the data transmission sent on the eigenmodes of H. Table 1 shows the spatial processing performed by the transmitting station, the received symbols at the receiving station, and the spatial processing performed by the receiving station. In Table 1, s is a T×1 vector with up to S data symbols to be transmitted, x is a T×1 vector with T transmit symbols to be sent from the T transmit antennas, r is an R×1 vector with R received symbols obtained from the R receive antennas, n is an R×1 noise vector, and ŝ is a T×1 vector with up to S detected data symbols, which are estimates of the data symbols in s.

TABLE 1

| Transmit Spatial Processing | Received Vector | Receive Spatial Processing |
|---|---|---|
| $\underline{x} = \underline{V} \cdot \underline{s}$ | $\underline{r} = \underline{H} \cdot \underline{x} + \underline{n}$ | $\hat{\underline{s}} = \underline{\Sigma}^{-1} \cdot \underline{U}^H \cdot \underline{r}$ |
| | | $\hat{\underline{s}} = \underline{\Lambda}^{-1} \cdot \underline{V}^H \cdot \underline{H}^H \cdot \underline{r}$ |

Eigenvalue decomposition and singular value decomposition of a complex matrix may be performed with an iterative process that uses Jacobi rotation, which is also commonly referred to as Jacobi method and Jacobi transformation. The Jacobi rotation zeros out a pair of off-diagonal elements of the complex matrix by performing a plane rotation on the matrix. For a 2×2 complex Hermitian matrix, only one iteration of the Jacobi rotation is needed to obtain the two eigenvectors and two eigenvalues for this 2×2 matrix. For a larger complex matrix with dimension greater than 2×2, the iterative process performs multiple iterations of the Jacobi rotation to obtain the desired eigenvectors and eigenvalues, or singular vectors and singular values, for the larger complex matrix. Each iteration of the Jacobi rotation on the larger complex matrix uses the eigenvectors of a 2×2 submatrix, as described below.

Eigenvalue decomposition of a 2×2 Hermitian matrix $R_{2\times 2}$ may be performed as follows. The Hermitian matrix $R_{2\times 2}$ may be expressed as:

$$R_{2\times 2} = \begin{bmatrix} r_{1,1} & r_{1,2} \\ r_{2,1} & r_{2,2} \end{bmatrix} = \begin{bmatrix} A & B \cdot e^{j\theta_b} \\ B \cdot e^{-j\theta_b} & D \end{bmatrix}, \quad \text{Eq (4)}$$

where A, B, and D are arbitrary real values, and $\theta_b$ is an arbitrary phase.

The first step of the eigenvalue decomposition of $R_{2\times 2}$ is to apply a two-sided unitary transformation, as follows:

$$R_{re} = \begin{bmatrix} 1 & 0 \\ 0 & e^{j\theta_b} \end{bmatrix} \cdot \begin{bmatrix} A & B \cdot e^{j\theta_b} \\ B \cdot e^{-j\theta_b} & D \end{bmatrix} \cdot \begin{bmatrix} 1 & 0 \\ 0 & e^{-j\theta_b} \end{bmatrix} = \begin{bmatrix} A & B \\ B & D \end{bmatrix}, \quad \text{Eq (5)}$$

where $R_{re}$ is a symmetric real matrix containing real values and having symmetric off-diagonal elements at locations (1, 2) and (2, 1).

The symmetric real matrix $R_{re}$ is then diagonalized using a two-sided Jacobi rotation, as follows:

$$\Lambda_{2\times 2} = \begin{bmatrix} \cos\phi & -\sin\phi \\ \sin\phi & \cos\phi \end{bmatrix} \cdot \begin{bmatrix} A & B \\ B & D \end{bmatrix} \cdot \begin{bmatrix} \cos\phi & \sin\phi \\ -\sin\phi & \cos\phi \end{bmatrix} = \begin{bmatrix} \lambda_1 & 0 \\ 0 & \lambda_2 \end{bmatrix}, \quad \text{Eq (6)}$$

where angle φ may be expressed as:

$$\phi = \frac{1}{2}\tan^{-1}\left(\frac{2B}{D-A}\right). \quad \text{Eq (7)}$$

A 2×2 unitary matrix $V_{2\times 2}$ of eigenvectors of $R_{2\times 2}$ may be derived as:

$$\underline{V}_{2\times 2} = \begin{bmatrix} 1 & 0 \\ 0 & e^{-j\theta_b} \end{bmatrix} \cdot \quad \text{Eq (8)}$$

$$\begin{bmatrix} \cos\phi & \sin\phi \\ -\sin\phi & \cos\phi \end{bmatrix} = \begin{bmatrix} \cos\phi & \sin\phi \\ -e^{-j\theta_b}\cdot\sin\phi & e^{-j\theta_b}\cdot\cos\phi \end{bmatrix}.$$

The two eigenvalues $\lambda_1$ and $\lambda_2$ may be derived based on equation (6), or based on the equation $\Lambda_{2\times 2} = V_{2\times 2}^H \cdot R_{2\times 2} \cdot V_{2\times 2}$, as follows:

$$\lambda_1 = \frac{1}{2}(A+D) + \frac{1}{2}(A-D)\cdot\cos 2\phi - B\cdot\sin 2\phi, \text{ and} \quad \text{Eq (9)}$$

$$\lambda_2 = \frac{1}{2}(A+D) - \frac{1}{2}(A-D)\cdot\cos 2\phi + B\cdot\sin 2\phi.$$

In equation set (9), the ordering of the two eigenvalues is not fixed, and $\lambda_1$ may be larger than smaller than $\lambda_2$. However, if angle $\phi$ is constrained such that $|2\phi| \leq \pi/2$, then $\cos 2\phi \geq 0$, and $\sin 2\phi > 0$ if and only if $D>A$. Thus, the ordering of the two eigenvalues may be determined by the relative magnitudes of A and D. $\lambda_1$ is the larger eigenvalue if $A>D$, and $\lambda_2$ is the larger eigenvalue if $D>A$. If $A=D$, then $\sin 2\phi=1$ and $\lambda_2$ is the larger eigenvalue. If $\lambda_2$ is the larger eigenvalue, then the two eigenvalues $\Lambda_{2\times 2}$ may be swapped to maintain a predetermined ordering of largest to smallest eigenvalues, and the first and second columns of $V_{2\times 2}$ may also be swapped correspondingly. Maintaining this predetermined ordering for the two eigenvectors in $V_{2\times 2}$ results in the eigenvectors of a larger size matrix decomposed using $V_{2\times 2}$ to be ordered from largest to smallest eigenvalues, which is desirable.

The two eigenvalues $\lambda_1$ and $\lambda_2$ may also be computed directly from the elements of $R_{re}$, as follows:

$$\lambda_{1,2} = \frac{1}{2}(A+D) \pm B\cdot\sqrt{1+\left(\frac{D-A}{2B}\right)^2}. \quad \text{Eq (10)}$$

Equation (10) is the solution to a characteristic equation of $R_{2\times 2}$. In equation (10), $\lambda_1$ is obtained with the plus sign for the second quantity on the right hand side, and $\lambda_2$ is obtained with the minus sign for the second quantity, where $\lambda_1 \geq \lambda_2$.

Equation (8) requires the computation of $\cos\phi$ and $\sin\phi$ to derive the elements of $V_{2\times 2}$. The computation of $\cos\phi$ and $\sin\phi$ is complex. The elements of $V_{2\times 2}$ may be computed directly from the elements of $R_{2\times 2}$, as follows:

$$r = \sqrt{(\text{Re}\{r_{1,2}\})^2 + (\text{Im}\{r_{1,2}\})^2}, \quad \text{Eq (11a)}$$

$$r_1 = \frac{1}{r}, \quad \text{Eq (11b)}$$

$$c_1 = r_1 \cdot \text{Re}\{r_{1,2}\} = \cos(\angle r_{1,2}), \quad \text{Eq (11c)}$$

-continued $$s_1 = -r_1 \cdot \text{Im}\{r_{1,2}\} = \sin(\angle r_{1,2}), \quad \text{Eq (11d)}$$

$$g_1 = c_1 + js_1, \quad \text{Eq (11e)}$$

$$\tau = \frac{1}{2} \cdot r_1 \cdot (r_{2,2} - r_{1,1}), \quad \text{Eq (11f)}$$

$$x = \sqrt{1+\tau^2}, \quad \text{Eq (11g)}$$

$$t = \frac{1}{|\tau|+x}, \quad \text{Eq (11h)}$$

if $(\tau < 0)$, then $t = -t$, $\quad \text{Eq (11i)}$ $$c = \frac{1}{\sqrt{1+t^2}}, \quad \text{Eq (11j)}$$

$$s = t\cdot c, \quad \text{Eq (11k)}$$

if $(\tau < 0)$, then $\underline{V}_{2\times 2} = \begin{bmatrix} c & s \\ -g_1 \cdot s & g_1 \cdot c \end{bmatrix}, \quad \text{Eq (11l)}$ else $\underline{V}_{2\times 2} = \begin{bmatrix} s & c \\ g_1 \cdot c & -g_1 \cdot s \end{bmatrix},$ where $r_{1,1}$, $r_{1,2}$ and $r_{2,1}$ are elements of $R_{2\times 2}$, and $r$ is the magnitude of $r_{1,2}$. Since $g_1$ is a complex value, $V_{2\times 2}$ contains complex values in the second row.

Equation set (11) is designed to reduce the amount of computation to derive $V_{2\times 2}$ from $R_{2\times 2}$. For example, in equations (11c), (11d), and (11f), division by r is required. Instead, r is inverted to obtain $r_1$, and multiplication by $r_1$ is performed for equations (11c), (11d), and (11f). This reduces the number of divide operations, which are computationally more expensive than multiplies. Also, instead of computing the argument (phase) of the complex element $r_{1,2}$, which requires an arctangent operation, and then computing the cosine and sine of this phase value to obtain $c_1$ and $s_1$, various trigonometric identities are used to solve for $c_1$ and $s_1$ as a function of the real and imaginary parts of $r_{1,2}$ and using only a square root operation. Furthermore, instead of computing the arctangent in equation (7) and the sine and cosine functions in equation (8), other trigonometric identities are used to solve for c and s as functions of the elements of $R_{2\times 2}$.

Equation set (11) performs a complex Jacobi rotation on $R_{2\times 2}$ to obtain $V_{2\times 2}$. The set of computations in equation set (11) is designed to reduce the number of multiply, square root, and invert operations required to derive $V_{2\times 2}$. This can greatly reduce computational complexity for decomposition of a larger size matrix using $V_{2\times 2}$.

The eigenvalues of $R_{2\times 2}$ may be computed as follows:

$$y = \frac{1}{2}\cdot(r_{1,1} + r_{2,2}), \quad \text{Eq (12a)}$$

$$z = x\cdot r, \quad \text{Eq (12b)}$$

$$\lambda_1 = y + z, \text{ and} \quad \text{Eq (12c)}$$

$$\lambda_2 = y - z. \quad \text{Eq (12d)}$$

1. Eigenvalue Decomposition

Eigenvalue decomposition of an N×N Hermitian matrix that is larger than 2×2, as shown in equation (2), may be performed with an iterative process. This iterative process uses the Jacobi rotation repeatedly to zero out the off-diagonal elements in the N×N Hermitian matrix. For the iterative process, N×N unitary transformation matrices are formed based on 2×2 Hermitian submatrices of the N×N Hermitian matrix and are repeatedly applied to diagonalize the N×N Hermitian matrix. Each unitary transformation matrix contains four non-trivial elements (i.e., elements other than 0 or 1) that are derived from elements of a corresponding 2×2 Hermitian submatrix. The transformation matrices are also called Jacobi rotation matrices. After completing all of the Jacobi rotation, the resulting diagonal matrix contains the real eigenvalues of the N×N Hermitian matrix, and the product of all of the unitary transformation matrices is an N×N matrix of eigenvectors for the N×N Hermitian matrix.

In the following description, index i denotes the iteration number and is initialized as i=0. R is an N×N Hermitian matrix to be decomposed, where N>2. An N×N matrix $D_i$ is an approximation of the diagonal matrix $\Lambda$ of eigenvalues of R and is initialized as $D_0$=R. An N×N matrix $V_i$ is an approximation of the matrix V of eigenvectors of R and is initialized as $V_0$=I.

A single iteration of the Jacobi rotation to update matrices $D_i$ and $V_i$ may be performed as follows. First, a 2×2 Hermitian matrix $D_{pq}$ is formed based on the current $D_i$, as follows:

$$D_{pq} = \begin{bmatrix} d_{p,p} & d_{p,q} \\ d_{q,p} & d_{q,q} \end{bmatrix}, \qquad \text{Eq (13)}$$

where $d_{p,q}$ is the element at location (p,q) in $D_i$; and $p \in \{1, \ldots, N\}, q \in \{1, \ldots, N\}, \text{and } p \neq q$.

$D_{pq}$ is a 2×2 submatrix of $D_i$, and the four elements of $D_{pq}$ are four elements at locations (p,p), (p,q), (q,p) and (q,q) in $D_i$. The values for indices p and q may be selected in various manners, as described below.

Eigenvalue decomposition of $D_{pq}$ is then performed, e.g., as shown in equation set (11), to obtain a 2×2 unitary matrix $V_{pq}$ of eigenvectors of $D_{pq}$. For the eigenvalue decomposition of $D_{pq}$, $R_{2 \times 2}$ in equation (4) is replaced with $D_{pq}$, and $V_{2 \times 2}$ from equation (111) is provided as $V_{pq}$.

An N×N complex Jacobi rotation matrix $T_{pq}$ is then formed with matrix $V_{pq}$. $T_{pq}$ is an identity matrix with the four elements at locations (p,p), (p,q), (q,p) and (q,q) replaced with the (1, 1), (1, 2), (2, 1) and (2, 2) elements, respectively, of $V_{pq}$. $T_{pq}$ has the following form:

$$T_{pq} = \begin{bmatrix} 1 & & & & & \\ & \ddots & & & & \\ & & v_{1,1} & \cdots & v_{1,2} & \\ & & \vdots & 1 & \vdots & \\ & & v_{2,1} & \cdots & v_{2,2} & \\ & & & & & \ddots \\ & & & & & & 1 \end{bmatrix}, \qquad \text{Eq (14)}$$

where $v_{1,1}$, $v_{1,2}$, $v_{2,1}$ and $v_{2,2}$ are the four elements of $V_{pq}$. All of the other off-diagonal elements of $T_{pq}$ are zeros. Equation (111) indicates that $T_{pq}$ is a complex matrix containing complex values for $v_{2,1}$ and $v_{2,2}$. $T_{pq}$ is also called a transformation matrix that performs the Jacobi rotation.

Matrix $D_i$ is then updated as follows:

$$D_{i+1} = T_{pq}^H \cdot D_i \cdot T_{pq}. \qquad \text{Eq (15)}$$

Equation (15) zeros out two off-diagonal elements $d_{p,q}$ and $d_{q,p}$ at locations (p,q) and (q,p), respectively, in $D_i$. The computation may alter the values of the other off-diagonal elements in $D_i$.

Matrix $V_i$ is also updated as follows:

$$V_{i+1} = V_i \cdot T_{pq}. \qquad \text{Eq (16)}$$

$V_i$ may be viewed as a cumulative transformation matrix that contains all of the Jacobi rotation matrices $T_{pq}$ used on $D_i$.

Each iteration of the Jacobi rotation zeros out two off-diagonal elements of $D_i$. Multiple iterations of the Jacobi rotation may be performed for different values of indices p and q to zero out all of the off-diagonal elements of $D_i$. The indices p and q may be selected in a predetermined manner by sweeping through all possible values.

A single sweep across all possible values for indices p and q may be performed as follows. The index p may be stepped from 1 through N−1 in increments of one. For each value of p, the index q may be stepped from p+1 through N in increments of one. An iteration of the Jacobi rotation to update $D_i$ and $V_i$ may be performed for each different combination of values for p and q. For each iteration, $D_{pq}$ is formed based on the values of p and q and the current $D_i$ for that iteration, $V_{pq}$ is computed for $D_{pq}$ as shown in equation set (11), $T_{pq}$ is formed with $V_{pq}$ as shown in equation (14), $D_i$ is updated as shown in equation (15), and $V_i$ is updated as shown in equation (16). For a given combination of values for p and q, the Jacobi rotation to update $D_i$ and $V_i$ may be skipped if the magnitude of the off-diagonal elements at locations (p,q) and (q,p) in $D_i$ is below a predetermined threshold.

A sweep consists of N·(N−1)/2 iterations of the Jacobi rotation to update $D_i$ and $V_i$ for all possible values of p and q. Each iteration of the Jacobi rotation zeros out two off-diagonal elements of $D_i$ but may alter other elements that might have been zeroed out earlier. The effect of sweeping through indices p and q is to reduce the magnitude of all off-diagonal elements of $D_i$, so that $D_i$ approaches the diagonal matrix $\Lambda$. $V_i$ contains an accumulation of all Jacobi rotation matrices that collectively gives $D_i$. Thus, $V_i$ approaches V as $D_i$ approaches $\Lambda$.

Any number of sweeps may be performed to obtain more and more accurate approximations of V and $\Lambda$. Computer simulations have shown that four sweeps should be sufficient to reduce the off-diagonal elements of $D_i$ to a negligible level, and three sweeps should be sufficient for most applications. A predetermined number of sweeps (e.g., three or four sweeps) may be performed. Alternatively, the off-diagonal elements of $D_i$ may be checked after each sweep to determine whether $D_i$ is sufficiently accurate. For example, the total error (e.g., the power in all off-diagonal elements of $D_i$) may be computed after each sweep and compared against an error threshold, and the iterative process may be terminated if the total error is below the error threshold. Other conditions or criteria may also be used to terminate the iterative process.

The values for indices p and q may also be selected in a deterministic manner. As an example, for each iteration i, the largest off-diagonal element of $D_i$ may be identified and denoted as $d_{p,q}$. Jacobi rotation may then be performed with $D_{pq}$ containing this largest off-diagonal element $d_{p,q}$ and three other elements at locations (p,p), (q,p), and (q,q) in $D_i$. The iterative process may be performed until a termination condition is encountered. The termination condition may be, for example, completion of a predetermined number of iterations, satisfaction of the error criterion described above, or some other condition or criterion.

Upon termination of the iterative process, the final $V_i$ is a good approximation of V, and the final $D_i$ is a good approximation of Λ. The columns of $V_i$ may be provided as the eigenvectors of R, and the diagonal elements of $D_i$ may be provided as the eigenvalues of R. The eigenvalues in the final $D_i$ are ordered from largest to smallest because the eigenvectors in $V_{pq}$ for each iteration are ordered. The eigenvectors in the final $V_i$ are also ordered based on their associated eigenvalues in $D_i$.

FIG. 1 shows an iterative process 100 for performing eigenvalue decomposition of an N×N Hermitian matrix R, where N>2, using Jacobi rotation. Matrices $V_i$ and $D_i$ are initialized as $V_0$=I and $D_0$=R, and index i is initialized as i=1 (block 110).

For iteration i, the values for indices p and q are selected in a predetermined manner (e.g., by stepping through all possible values for these indices) or a deterministic manner (e.g., by selecting the index values for the largest off-diagonal element) (block 112). A 2×2 matrix $D_{pq}$ is then formed with four elements of matrix $D_i$ at the locations determined by indices p and q (block 114). Eigenvalue decomposition of $D_{pq}$ is then performed, e.g., as shown in equation set (11), to obtain a 2×2 matrix $V_{pq}$ of eigenvectors of $D_{pq}$ (block 116). An N×N complex Jacobi rotation matrix $T_{pq}$ is then formed based on matrix $V_{pq}$, as shown in equation (14) (block 118). Matrix $D_i$ is then updated based on $T_{pq}$, as shown in equation (15) (block 120). Matrix $V_i$ is also updated based on $T_{pq}$, as shown in equation (16) (block 122).

A determination is then made whether to terminate the eigenvalue decomposition of R (block 124). The termination criterion may be based on the number of iterations or sweeps already performed, an error criterion, and so on. If the answer is 'No' for block 124, then index i is incremented (block 126), and the process returns to block 112 for the next iteration. Otherwise, if termination is reached, then matrix $D_i$ is provided as an approximation of diagonal matrix Λ, and matrix $V_i$ is provided as an approximation of matrix V of eigenvectors of R (block 128).

For a MIMO system with multiple subbands (e.g., a MIMO system that utilizes OFDM), multiple channel response matrices H(k) may be obtained for different subbands. The iterative process may be performed for each channel response matrix H(k) to obtain matrices $D_i(k)$ and $V_i(k)$, which are approximations of diagonal matrix Λ(k) and matrix V(k) of eigenvectors, respectively, of R(k)=$H^H$(k)·H(k).

A high degree of correlation typically exists between adjacent subbands in a MIMO channel. This correlation may be exploited by the iterative process to reduce the amount of computation to derive $D_i(k)$ and $V_i(k)$ for the subbands of interest. For example, the iterative process may be performed for one subband at a time, starting from one end of the system bandwidth and traversing toward the other end of the system bandwidth. For each subband k except for the first subband, the final solution $V_i(k-1)$ obtained for the prior subband k−1 may be used as an initial solution for the current subband k. The initialization for each subband k may be given as: $V_0(k) = V_i(k-1)$ and $D_0(k) = V_0^H(k) \cdot R(k) \cdot V_0(k)$. The iterative process then operates on the initial solutions of $D_0(k)$ and $V_0(k)$ for subband k until a termination condition is encountered.

The concept described above may also be used across time. For each time interval t, the final solution $V_i(t-1)$ obtained for a prior time interval t−1 may be used as an initial solution for the current time interval t. The initialization for each time interval t may be given as: $V_0(t) = V_i(t-1)$ and $D_0(t) = V_0^H(t) \cdot R(t) \cdot V_0(t)$, where $R(t) = H^H(t) \cdot H(t)$ and H(t) is the channel response matrix for time interval t. The iterative process then operates on the initial solutions of $D_0(t)$ and $V_0(t)$ for time interval t until a termination condition is encountered. The concept may also be used across both frequency and time. For each subband in each time interval, the final solution obtained for a prior subband and/or the final solution obtained for a prior time interval may be used as an initial solution for the current subband and time interval.

2. Singular Value Decomposition

The iterative process may also be used for singular value decomposition of an arbitrary complex matrix H that is larger than 2×2. The singular value decomposition of H is given as H=U·Σ·$V^H$. The following observations may be made regarding H. First, matrix R=$H^H$·H and matrix $\tilde{R}$=H·$H^H$ are both Hermitian matrices. Second, right singular vectors of H, which are the columns of V, are also eigenvectors of R. Correspondingly, left singular vectors of H, which are the columns of U, are also eigenvectors of $\tilde{R}$. Third, the non-zero eigenvalues of R are equal to the non-zero eigenvalues of $\tilde{R}$, and are the square of corresponding singular values of H.

A 2×2 matrix $H_{2\times 2}$ of complex values may be expressed as:

$$\underline{H}_{2\times 2} = \begin{bmatrix} h_{1,1} & h_{1,2} \\ h_{2,1} & h_{2,2} \end{bmatrix} = [\underline{h}_1 \ \underline{h}_2], \quad \text{Eq (17)}$$

where $h_1$ is a 2×1 vector with the elements in the first column of $H_{2\times 2}$; and $h_2$ is a 2×1 vector with the elements in the second column of $H_{2\times 2}$.

The right singular vectors of $H_{2\times 2}$ are the eigenvectors of $H_{2\times 2}^H \cdot H_{2\times 2}$ and may be computed using the eigenvalue decomposition described above in equation set (11). A 2×2 Hermitian matrix $R_{2\times 2}$ is defined as $R_{2\times 2} = H_{2\times 2}^H \cdot H_{2\times 2}$, and the elements of $R_{2\times 2}$ may be computed based on the elements of $H_{2\times 2}$, as follows:

$$\underline{R}_{2\times 2} = \begin{bmatrix} r_{1,1} & r_{1,2} \\ r_{1,2}^* & r_{2,2} \end{bmatrix}, \quad \text{Eq (18a)}$$

$$r_{1,1} = |\underline{h}_1|^2 = h_{1,1}^* \cdot h_{1,1} + h_{2,1}^* \cdot h_{2,1}, \quad \text{Eq (18b)}$$

$$r_{2,2} = |\underline{h}_2|^2 = h_{1,2}^* \cdot h_{1,2} + h_{2,2}^* \cdot h_{2,2}, \quad \text{and} \quad \text{Eq (18c)}$$

$$r_{1,2} = \underline{h}_1^H \cdot \underline{h}_2 = h_{1,1}^* \cdot h_{1,2} + h_{2,1}^* \cdot h_{2,2}. \quad \text{Eq (18d)}$$

For Hermitian matrix $R_{2\times 2}$, $r_{2,1}$ does not need to be computed since $r_{2,1} = r^*_{1,2}$. Equation set (11) may be applied to $R_{2\times 2}$ to obtain a matrix $V_{2\times 2}$. $V_{2\times 2}$ contains the eigenvectors of $R_{2\times 2}$, which are also the right singular vectors of $H_{2\times 2}$.

The left singular vectors of $H_{2\times 2}$ are the eigenvectors of $H_{2\times 2} \cdot H_{2\times 2}^H$ and may also be computed using the eigenvalue decomposition described above in equation set (11). A 2×2 Hermitian matrix $\tilde{R}_{2\times 2}$ is defined as $\tilde{R}_{2\times 2} = H_{2\times 2} \cdot H_{2\times 2}^H$, and the elements of $\tilde{R}_{2\times 2}$ may be computed based on the elements of $H_{2\times 2}$, as follows:

$$\underline{\tilde{R}}_{2\times 2} = \begin{bmatrix} \tilde{r}_{1,1} & \tilde{r}_{1,2} \\ \tilde{r}_{1,2}^* & \tilde{r}_{2,2} \end{bmatrix}, \quad \text{Eq (19a)}$$

$$\tilde{r}_{1,1} = h_{1,1}^* \cdot h_{1,1} + h_{1,2}^* \cdot h_{1,2}, \quad \text{Eq (19b)}$$

$$\tilde{r}_{2,2} = h_{2,1}^* \cdot h_{2,1} + h_{2,2}^* \cdot h_{2,2}, \quad \text{and} \quad \text{Eq (19b)}$$

-continued $$\tilde{r}_{1,2} = h_{2,1}^* \cdot h_{1,1} + h_{2,2}^* \cdot h_{1,2}. \quad \text{Eq (19c)}$$

Equation set (11) may be applied to $\tilde{R}_{2\times2}$ to obtain a matrix $\tilde{V}_{2\times2}$. $\tilde{V}_{2\times2}$ contains the eigenvectors of $\tilde{R}_{2\times2}$, which are also the left singular vectors of $H_{2\times2}$.

The iterative process described above for eigenvalue decomposition of an N×N Hermitian matrix R may be used for singular value decomposition of an arbitrary complex matrix H larger than 2×2. H has a dimension of R×T, where R is the number of rows and T is the number of columns. The iterative process for singular value decomposition (SVD) of H may be performed in several manners.

In a first SVD embodiment, the iterative process derives approximations of the right singular vectors in V and the scaled left singular vectors in U·Σ. For this embodiment, a T×T matrix $V_i$ is an approximation of V and is initialized as $V_0=I$. An R×T matrix $W_i$ is an approximation of U·Σ and is initialized as $W_0=H$.

For the first SVD embodiment, a single iteration of the Jacobi rotation to update matrices $V_i$ and $W_i$ may be performed as follows. First, a 2×2 Hermitian matrix $M_{pq}$ is formed based on the current $W_i$. $M_{pq}$ is a 2×2 submatrix of $W_i^H \cdot W_i$ and contains four elements at locations (p,p), (p,q), (q,p) and (q,q) in $W_i^H \cdot W_i$. The elements of $M_{pq}$ may be computed as follows:

$$M_{pq} = \begin{bmatrix} m_{1,1} & m_{1,2} \\ m_{1,2}^* & m_{2,2} \end{bmatrix}, \quad \text{Eq (20a)}$$

$$m_{1,1} = |\underline{w}_p|^2 = \sum_{l=1}^{R} w_{l,p}^* \cdot w_{l,p}, \quad \text{Eq (20b)}$$

$$m_{2,2} = |\underline{w}_q|^2 = \sum_{l=1}^{R} w_{l,q}^* \cdot w_{l,q}, \text{ and} \quad \text{Eq (20c)}$$

$$m_{1,2} = \underline{w}_p^H \cdot \underline{w}_q = \sum_{l=1}^{R} w_{l,p}^* \cdot w_{l,q}, \quad \text{Eq (20d)}$$

where $w_p$ is column p of $W_i$, $w_q$ is column q of $W_i$, and $w_{l,p}$ is the element at location (l,p) in $W_i$. Indices p and q are such that $p \in \{1, \ldots, T\}$, $q \in \{1, \ldots, T\}$, and $p \neq q$. The values for indices p and q may be selected in various manners, as described below.

Eigenvalue decomposition of $M_{pq}$ is then performed, e.g., as shown in equation set (11), to obtain a 2×2 unitary matrix $V_{pq}$ of eigenvectors of $M_{pq}$. For this eigenvalue decomposition, $R_{2\times2}$ is replaced with $M_{pq}$, and $V_{2\times2}$ is provided as $V_{pq}$.

A T×T complex Jacobi rotation matrix $T_{pq}$ is then formed with matrix $V_{pq}$. $T_{pq}$ is an identity matrix with the four elements at locations (p,p), (p,q), (q,p) and (q,q) replaced with the (1, 1), (1, 2), (2, 1) and (2, 2) elements, respectively, of $V_{pq}$. $T_{pq}$ has the form shown in equation (14).

Matrix $V_i$ is then updated as follows:

$$V_{i+1} = V_i \cdot T_{pq}. \quad \text{Eq (21)}$$

Matrix $W_i$ is also updated as follows:

$$W_{i+1} = W_i \cdot T_{pq}. \quad \text{Eq (22)}$$

For the first SVD embodiment, the iterative process repeatedly zeros out off-diagonal elements of $W_i^H \cdot W_i$ without explicitly computing $H^H \cdot H$. The indices p and q may be swept by stepping p from 1 through T−1 and, for each value of p, stepping q from p+1 through T. Alternatively, the values of p and q for which $|w_p^H \cdot w_q|$ is largest may be selected for each iteration. The iterative process is performed until a termination condition is encountered, which may be a predetermined number of sweeps, a predetermined number of iterations, satisfaction of an error criterion, and so on.

Upon termination of the iterative process, the final $V_i$ is a good approximation of V, and the final $W_i$ is a good approximation of U·Σ. When converged, $W_i^H \cdot W_i \approx \Sigma^T \cdot \Sigma$ and $U=W_i \cdot \Sigma^{-1}$, where "T" denotes a transpose. For a square diagonal matrix, the final solution of Σ may be given as: $\hat{\Sigma}=(W_i^H \cdot W_i)^{1/2}$. For a non-square diagonal matrix, the non-zero diagonal elements of $\hat{\Sigma}$ are given by the square roots of the diagonal elements of $W_i^H \cdot W_i$. The final solution of U may be given as: $\hat{U}=W_i \cdot \hat{\Sigma}^{-1}$.

Figure 2:
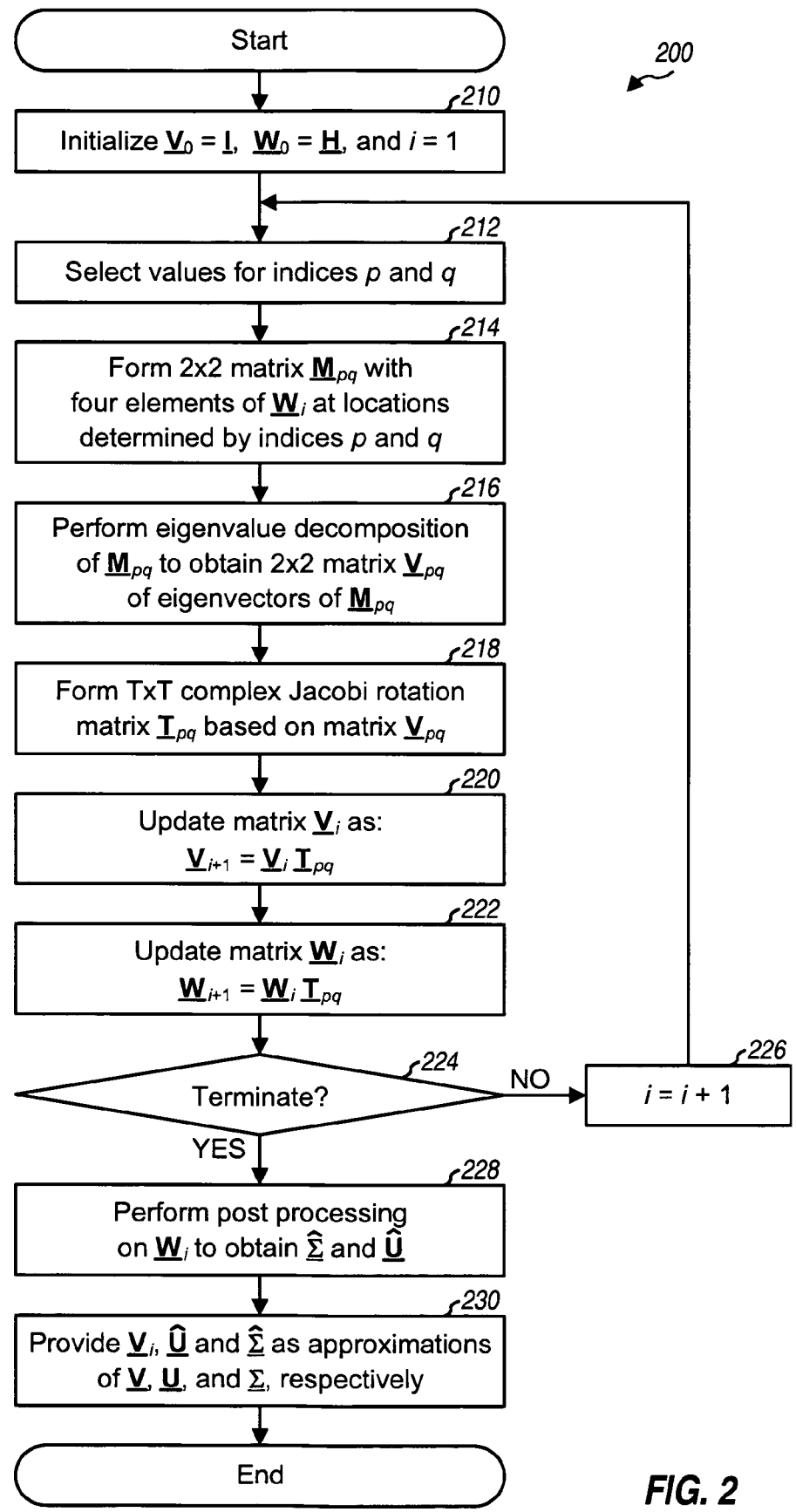
FIG. 2 shows a process for performing singular value decomposition using Jacobi rotation in accordance with the first SVD embodiment.

FIG. 2 shows an iterative process 200 for performing singular value decomposition of an arbitrary complex matrix H that is larger than 2×2 using Jacobi rotation, in accordance with the first SVD embodiment. Matrices $V_i$ and $W_i$ are initialized as $V_0=I$ and $W_0=H$, and index i is initialized as i=1 (block 210).

For iteration i, the values for indices p and q are selected in a predetermined or deterministic manner (block 212). A 2×2 matrix $M_{pq}$ is then formed with four elements of matrix $W_i$ at the locations determined by indices p and q as shown in equation set (20) (block 214). Eigenvalue decomposition of $M_{pq}$ is then performed, e.g., as shown in equation set (11), to obtain a 2×2 matrix $V_{pq}$ of eigenvectors of $M_{pq}$ (block 216). A T×T complex Jacobi rotation matrix $T_{pq}$ is formed based on matrix $V_{pq}$, as shown in equation (14) (block 218). Matrix $V_i$ is then updated based on $T_{pq}$, as shown in equation (21) (block 220). Matrix $W_i$ is also updated based on $T_{pq}$, as shown in equation (22) (block 222).

A determination is then made whether to terminate the singular value decomposition of H (block 224). The termination criterion may be based on the number of iterations or sweeps already performed, an error criterion, and so on. If the answer is 'No' for block 224, then index i is incremented (block 226), and the process returns to block 212 for the next iteration. Otherwise, if termination is reached, then post processing is performed on $W_i$ to obtain $\hat{\Sigma}$ and $\hat{U}$ (block 228). Matrix $V_i$ is provided as an approximation of matrix V of right singular vectors of H, matrix $\hat{U}$ is provided as an approximation of matrix U of left singular vectors of H, and matrix $\hat{\Sigma}$ is provided as an approximation of matrix Σ of singular values of H (block 230)

The left singular vectors of H may be obtained by performing the first SVD embodiment and solving for scaled left singular vectors H·V=U·Σ and then normalizing. The left singular vectors of H may also be obtained by performing the iterative process for eigenvalue decomposition of H·H$^H$.

In a second SVD embodiment, the iterative process directly derives approximations of the right singular vectors in V and the left singular vectors in U. This SVD embodiment applies the Jacobi rotation on a two-sided basis to simultaneously solve for the left and right singular vectors. For an arbitrary complex 2×2 matrix $H_{2\times2}=[h_1 \ h_2]$, the conjugate transpose of this matrix is $H_{2\times2}^H=[\tilde{h}_1 \ \tilde{h}_2]$, where $\tilde{h}_1$ and $\tilde{h}_2$ are the two columns of $H_{2\times2}^H$ and are also the complex conjugates of the rows of $H_{2\times2}$. The left singular vectors of $H_{2\times2}$ are also the right singular vectors of $H_{2\times2}^H$. The right singular vectors of $H_{2\times2}$ may be computed using Jacobi rotation, as described above for equation set (18). The left singular vectors of $H_{2\times2}$ may be obtained by computing the right singular vectors of $H_{2\times2}^H$ using Jacobi rotation, as described above for equation set (19).

For the second SVD embodiment, a T×T matrix $V_i$ is an approximation of V and is initialized as $V_0=I$. An R×R matrix $U_i$ is an approximation of U and is initialized as $U_0=I$. An R×T matrix $D_i$ is an approximation of $\Sigma$ and is initialized as $D_0=H$.

For the second SVD embodiment, a single iteration of the Jacobi rotation to update matrices $V_i$, $U_i$ and $D_i$ may be performed as follows. First, a 2×2 Hermitian matrix $X_{p_1 q_1}$ is formed based on the current $D_i$. $X_{p_1 q_1}$ is a 2×2 submatrix of $D_i^H \cdot D_i$ and contains four elements at locations $(p_1,p_1)$, $(p_1,q_1)$, $(q_1,p_1)$ and $(q_1,q_1)$ in $D_i^H \cdot D_i$. The four elements of $X_{p_1 q_1}$ may be computed as follows:

$$X_{p_1,q_1} = \begin{bmatrix} x_{1,1} & x_{1,2} \\ x_{1,2}^* & x_{2,2} \end{bmatrix}, \quad \text{Eq (23a)}$$

$$x_{1,1} = |d_{p_1}|^2 = \sum_{l=1}^{R} d_{l,p_1}^* \cdot d_{l,p_1}, \quad \text{Eq (23b)}$$

$$x_{2,2} = |d_{q_1}|^2 = \sum_{l=1}^{R} d_{l,q_1}^* \cdot d_{l,q_1}, \text{ and} \quad \text{Eq (23c)}$$

$$x_{1,2} = \underline{d}_{p_1}^H \cdot \underline{d}_{q_1} = \sum_{l=1}^{R} d_{l,p_1}^* \cdot d_{l,q_1}, \quad \text{Eq (23d)}$$

where $d_{p_1}$ is column $p_1$ of $D_i$, $d_{q_1}$ is column $q_1$ of $D_i$, and $d_{l,p_1}$ is the element at location $(l,p_1)$ in $D_i$. Indices $p_1$ and $q_1$ are such that $p_1 \in \{1, \ldots, T\}$, $_1 \in \{1, \ldots, T\}$, and $p_1 \neq q_1$. Indices $p_1$ and $q_1$ may be selected in various manners, as described below.

Eigenvalue decomposition of $X_{p_1 q_1}$ is then performed, e.g., as shown in equation set (11), to obtain a 2×2 matrix $V_{p_1 q_1}$ of eigenvectors of $X_{p_1 q_1}$. For this eigenvalue decomposition, $R_{2\times 2}$ is replaced with $X_{p_1 q_1}$, and $V_{2\times 2}$ is provided as $V_{p_1 q_1}$. A T×T complex Jacobi rotation matrix $T_{p_1 q_1}$ is then formed with matrix $V_{p_1 q_1}$ and contains the four elements of $V_{p_1 q_1}$ at locations $(p_1,p_1)$, $(p_1,q_1)$, $(q_1,p_1)$ and $(q_1,q_1)$. $T_{p_1 q_1}$ has the form shown in equation (14).

Another 2×2 Hermitian matrix $Y_{p_2 q_2}$ is also formed based on the current D. $Y_{p_2 q_2}$ is a 2×2 submatrix of $D_i \cdot D_i^H$ and contains elements at locations $(p_2,p_2)$, $(p_2,q_2)$, $(q_2,p_2)$ and $(q_2,q_2)$ in $D_i \cdot D_i^H$. The elements of $Y_{p_2 q_2}$ may be computed as follows:

$$Y_{p_2 q_2} = \begin{bmatrix} y_{1,1} & y_{1,2} \\ y_{1,2}^* & y_{2,2} \end{bmatrix}, \quad \text{Eq (24a)}$$

$$y_{1,1} = |\tilde{d}_{p_2}|^2 = \sum_{l=1}^{T} d_{p_2,l} \cdot d_{p_2,l}^*, \quad \text{Eq (24b)}$$

$$y_{2,2} = |\tilde{d}_{q_2}|^2 = \sum_{l=1}^{T} d_{q_2,l} \cdot d_{q_2,l}^*, \text{ and} \quad \text{Eq (24c)}$$

$$y_{1,2} = \tilde{d}_{p_2} \cdot \tilde{d}_{q_2}^H = \sum_{l=1}^{T} d_{p_2,l} \cdot d_{q_2,l}^*, \quad \text{Eq (24d)}$$

where $\tilde{d}_{p_2}$ is row $p_2$ of $D_i$, $\tilde{d}_{q_2}$ is row $q_2$ of $D_i$, and $d_{p_2,l}$ is the element at location $(p_2,l)$ in $D_i$. Indices $p_2$ and $q_2$ are such that $p_2 \in \{1, \ldots, R\}$, $q_2 \in \{1, \ldots, R\}$, and $p_2 \neq q_2$. Indices $p_2$ and $q_2$ may also be selected in various manners, as described below.

Eigenvalue decomposition of $Y_{p_2 q_2}$ is then performed, e.g., as shown in equation set (11), to obtain a 2×2 matrix $U_{p_2 q_2}$ of eigenvectors of $Y_{p_2 q_2}$. For this eigenvalue decomposition, $R_{2\times 2}$ is replaced with $Y_{p_2 q_2}$, and $V_{2\times 2}$ is provided as $U_{p_2 q_2}$. An R×R complex Jacobi rotation matrix $S_{p_2 q_2}$ is then formed with matrix $U_{p_2 q_2}$ and contains the four elements of $U_{p_2 q_2}$ at locations $(p_2,p_2)$, $(p_2,q_2)$, $(q_2,p_2)$ and $(q_2,q_2)$. $S_{p_2 q_2}$ has the form shown in equation (14).

Matrix $V_i$ is then updated as follows:

$$V_{i+1} = V_i \cdot T_{p_1 q_1}. \quad \text{Eq (25)}$$

Matrix $U_i$ is updated as follows:

$$U_{i+1} = U_i \cdot S_{p_2 q_2}. \quad \text{Eq (26)}$$

Matrix $D_i$ is updated as follows:

$$D_{i+1} = S_{p_2 q_2}^H \cdot D_i \cdot T_{p_1 q_1}. \quad \text{Eq (27)}$$

For the second SVD embodiment, the iterative process alternately finds (1) the Jacobi rotation that zeros out the off-diagonal elements with indices $p_1$ and $q_1$ in $H^H \cdot H$ and (2) the Jacobi rotation that zeros out the off-diagonal elements with indices $p_2$ and $q_2$ in $H \cdot H^H$. The indices $p_1$ and $q_1$ may be swept by stepping $p_1$ from 1 through T−1 and, for each value of $p_1$, stepping $q_1$ from $p_1+1$ through T. The indices $p_2$ and $q_2$ may also be swept by stepping $p_2$ from 1 through R−1 and, for each value of $p_2$, stepping $q_2$ from $p_2+1$ through R. As an example, for a square matrix H, the indices may be set as $p_1=p_2$ and $q_1=q_2$. As another example, for a square or non-square matrix H, a set of $p_1$ and $q_1$ may be selected, then a set of $p_2$ and $q_2$ may be selected, then a new set of $p_1$ and $q_1$ may be select, then a new set of $p_2$ and $p_2$ may be selected, and so on, so that new values are alternately selected for indices $p_1$ and $q_1$ and indices $p_2$ and $q_2$.

Alternatively, for each iteration, the values of $p_1$ and $q_1$ for which $|d_{p_1}^H \cdot d_{q_1}|$ is largest may be selected, and the values of $p_2$ and $q_2$ for which $|\tilde{d}_{p_2}^H \cdot \tilde{d}_{q_2}|$ is largest may be selected. The iterative process is performed until a termination condition is encountered, which may be a predetermined number of sweeps, a predetermined number of iterations, satisfaction of an error criterion, and so on.

Upon termination of the iterative process, the final $V_i$ is a good approximation of $\tilde{V}$, the final $U_i$ is a good approximation of U, and the final $D_i$ is a good approximation of $\tilde{\Sigma}$, where $\tilde{V}$ and $\tilde{\Sigma}$ may be rotated versions of V and $\Sigma$, respectively. The computation described above does not sufficiently constrain the left and right singular vector solutions so that the diagonal elements of the final $D_i$ are positive real values. The elements of the final $D_i$ may be complex values whose magnitudes are equal to the singular values of H. $V_i$ and $D_i$ may be unrotated as follows:

$$\hat{\Sigma} = D_i \cdot P, \text{ and} \quad \text{Eq (28a)}$$

$$\hat{V} = V_i \cdot P, \quad \text{Eq (28b)}$$

where P is a T×T diagonal matrix with diagonal elements having unit magnitude and phases that are the negative of the phases of the corresponding diagonal elements of $D_i$. $\hat{\Sigma}$ and $\hat{V}$ are the final approximations of $\Sigma$ and V, respectively.

Figure 3:
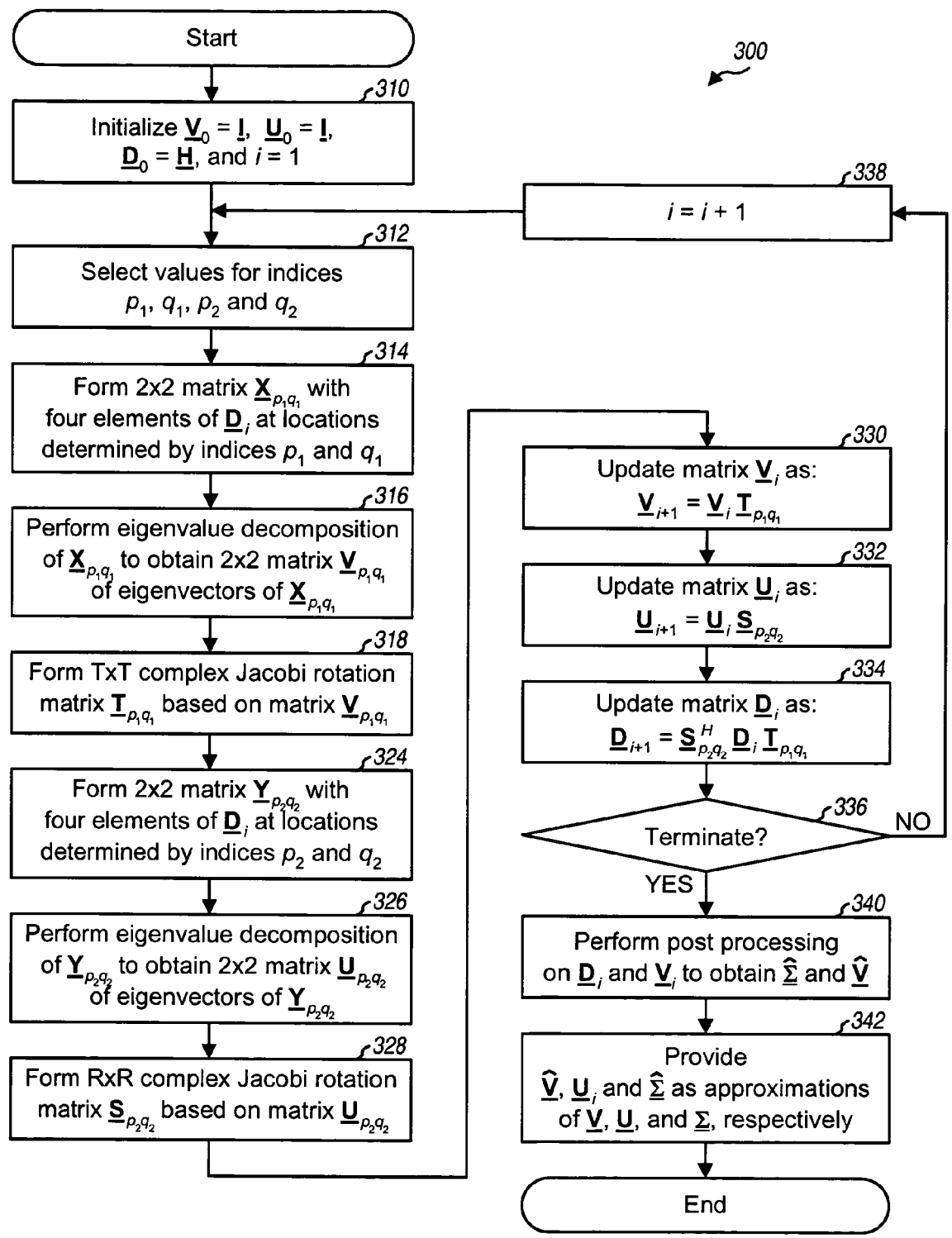
FIG. 3 shows a process for performing singular value decomposition using Jacobi rotation in accordance with the second SVD embodiment.

FIG. 3 shows an iterative process 300 for performing singular value decomposition of an arbitrary complex matrix H that is larger than 2×2 using Jacobi rotation, in accordance with the second SVD embodiment. Matrices $V_i$, $U_i$ and $D_i$ are initialized as $V_0=I$, $U_0=I$ and $D_0=H$, and index i is initialized as i=1 (block 310).

For iteration i, the values for indices $p_1$, $q_1$, $p_2$ and $q_2$ are selected in a predetermined or deterministic manner (block 312). A 2×2 matrix $X_{p_1 q_1}$ is formed with four elements of matrix $D_i$ at the locations determined by indices $p_1$ and $q_1$, as shown in equation set (23) (block 314). Eigenvalue decomposition of $X_{p_1q_1}$ is then performed, e.g., as shown in equation set (11), to obtain a 2×2 matrix $V_{p_1q_1}$ of eigenvectors of $X_{p_1q_1}$ (block 316). A T×T complex Jacobi rotation matrix $T_{p_1q_1}$ is then formed based on matrix $V_{p_1q_1}$ (block 318). A 2×2 matrix $Y_{p_2q_2}$ is also formed with four elements of matrix $D_i$ at the locations determined by indices $p_2$ and $q_2$, as shown in equation set (24) (block 324). Eigenvalue decomposition of $Y_{p_2q_2}$ is then performed, e.g., as shown in equation set (11), to obtain a 2×2 matrix $U_{p_2q_2}$ of eigenvectors of $Y_{p_2q_2}$ (block 326). An R×R complex Jacobi rotation matrix $S_{p_2q_2}$ is then formed based on matrix $U_{p_2q_2}$ (block 328).

Matrix $V_i$ is then updated based on $T_{p_1q_1}$, as shown in equation (25) (block 330). Matrix $U_i$ is updated based on $S_{p_2q_2}$, as shown in equation (26) (block 332). Matrix $D_i$ is updated based on $T_{p_1q_1}$ and $S_{p_2q_2}$, as shown in equation (27) (block 334).

A determination is then made whether to terminate the singular value decomposition of H (block 336). The termination criterion may be based on the number of iterations or sweeps already performed, an error criterion, and so on. If the answer is 'No' for block 336, then index i is incremented (block 338), and the process returns to block 312 for the next iteration. Otherwise, if termination is reached, then post processing is performed on $D_i$ and $V_i$ to obtain $\hat{\Sigma}$ and $\hat{V}$ (block 340). Matrix $\hat{V}$ is provided as an approximation of V, matrix $U_i$ is provided as an approximation of U, and matrix $\hat{\Sigma}$ is provided as an approximation of $\Sigma$ (block 342)

For both the first and second SVD embodiments, the right singular vectors in the final $V_i$ and the left singular vectors in the final $U_i$ or $\hat{U}$ are ordered from the largest to smallest singular values because the eigenvectors in $V_{pq}$ (for the first SVD embodiment) and the eigenvectors in $V_{p_1q_1}$ and $U_{p_2q_2}$ (for the second SVD embodiment) for each iteration are ordered.

For a MIMO system with multiple subbands, the iterative process may be performed for each channel response matrix H(k) to obtain matrices $V_i(k)$, $U_i(k)$, and $D_i(k)$, which are approximations of the matrix V(k) of right singular vectors, the matrix U(k) of left singular vectors, and the diagonal matrix $\Sigma(k)$ of singular values, respectively, for that H(k). The iterative process may be performed for one subband at a time, starting from one end of the system bandwidth and traversing toward the other end of the system bandwidth. For the first SVD embodiment, for each subband k except for the first subband, the final solution $V_i(k-1)$ obtained for the prior subband k−1 may be used as an initial solution for the current subband k, so that $V_0(k)=V_i(k-1)$ and $W_0(k)=1(k) \cdot V_0(k)$. For the second SVD embodiment, for each subband k except for the first subband, the final solutions $V_i(k-1)$ and $U_i(k-1)$ obtained for the prior subband k−1 may be used as initial solutions for the current subband k, so that $V_0(k)=V_i(k-1)$, $U_0(k)=U_i(k-1)$, and $D_0(k)=U_0^H(k) \cdot H(k) \cdot V_0(k)$. For both embodiments, the iterative process operates on the initial solutions for subband k until a termination condition is encountered for the subband. The concept may also be used across time or both frequency and time, as described above.

Figure 4:
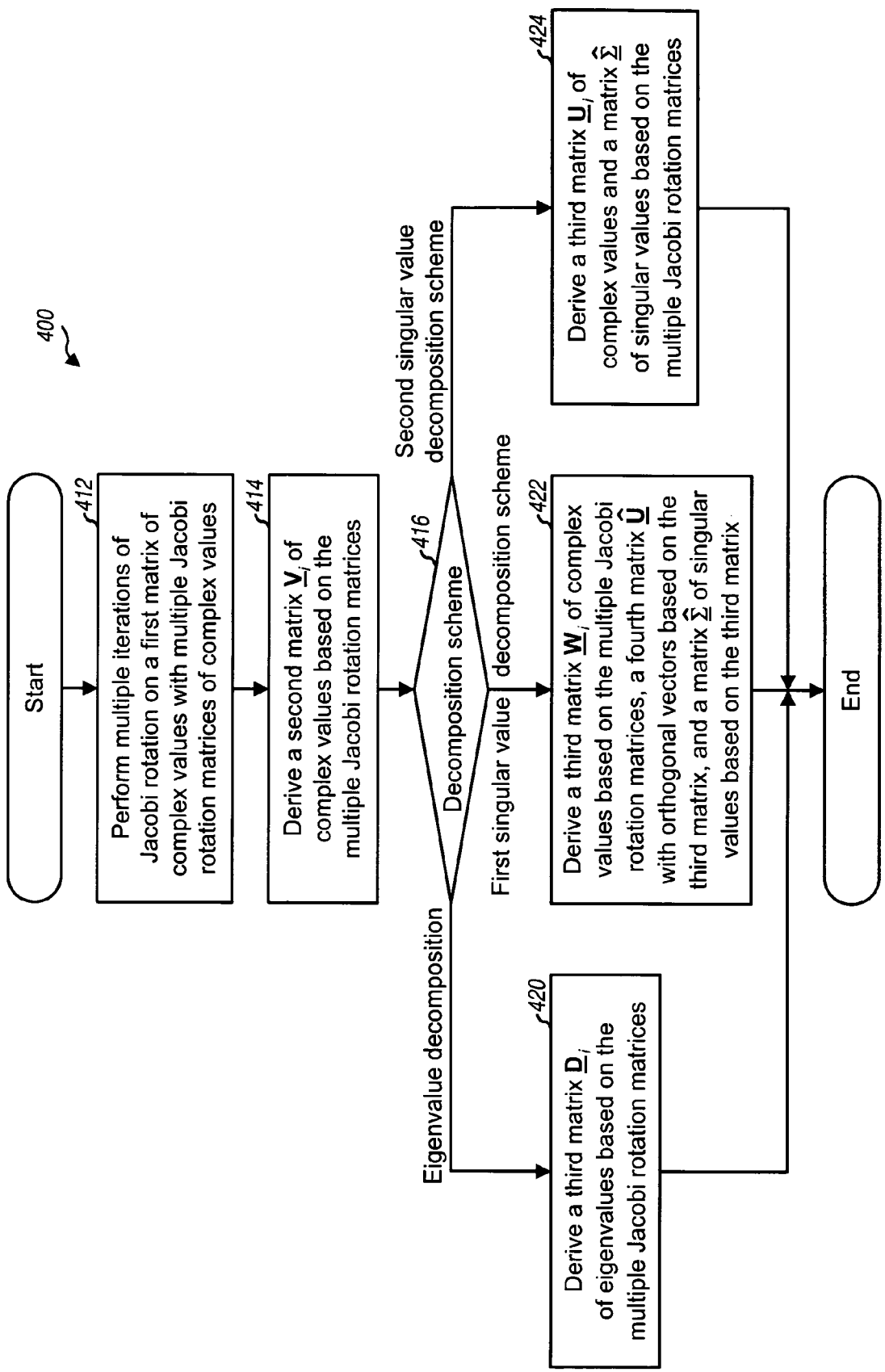
FIG. 4 shows a process for decomposing a matrix using Jacobi rotation.

FIG. 4 shows a process 400 for decomposing a matrix using Jacobi rotation. Multiple iterations of Jacobi rotation are performed on a first matrix of complex values with multiple Jacobi rotation matrices of complex values (block 412). The first matrix may be a channel response matrix H, a correlation matrix of H, which is R, or some other matrix. The Jacobi rotation matrices may be $T_{pq}$, $T_{p_1q_1}$, $S_{p_2q_2}$, and/or some other matrices. For each iteration, a submatrix may be formed based on the first matrix and decomposed to obtain eigenvectors for the submatrix, and a Jacobi rotation matrix may be formed with the eigenvectors and used to update the first matrix. A second matrix of complex values is derived based on the multiple Jacobi rotation matrices (block 414). The second matrix contains orthogonal vectors and may be matrix $V_i$ of right singular vectors of H or eigenvectors of R.

For eigenvalue decomposition, as determined in block 416, a third matrix $D_i$ of eigenvalues may be derived based on the multiple Jacobi rotation matrices (block 420). For singular value decomposition based on the first SVD embodiment or scheme, a third matrix $W_i$ of complex values may be derived based on the multiple Jacobi rotation matrices, a fourth matrix $\hat{U}$ with orthogonal vectors may be derived based on the third matrix $W_i$, and a matrix $\hat{\Sigma}$ of singular values may also be derived based on the third matrix $W_i$ (block 422). For singular value decomposition based on the second SVD embodiment, a third matrix $U_i$ with orthogonal vectors and a matrix $\hat{\Sigma}$ of singular values may be derived based on the multiple Jacobi rotation matrices (block 424).

Figure 5:
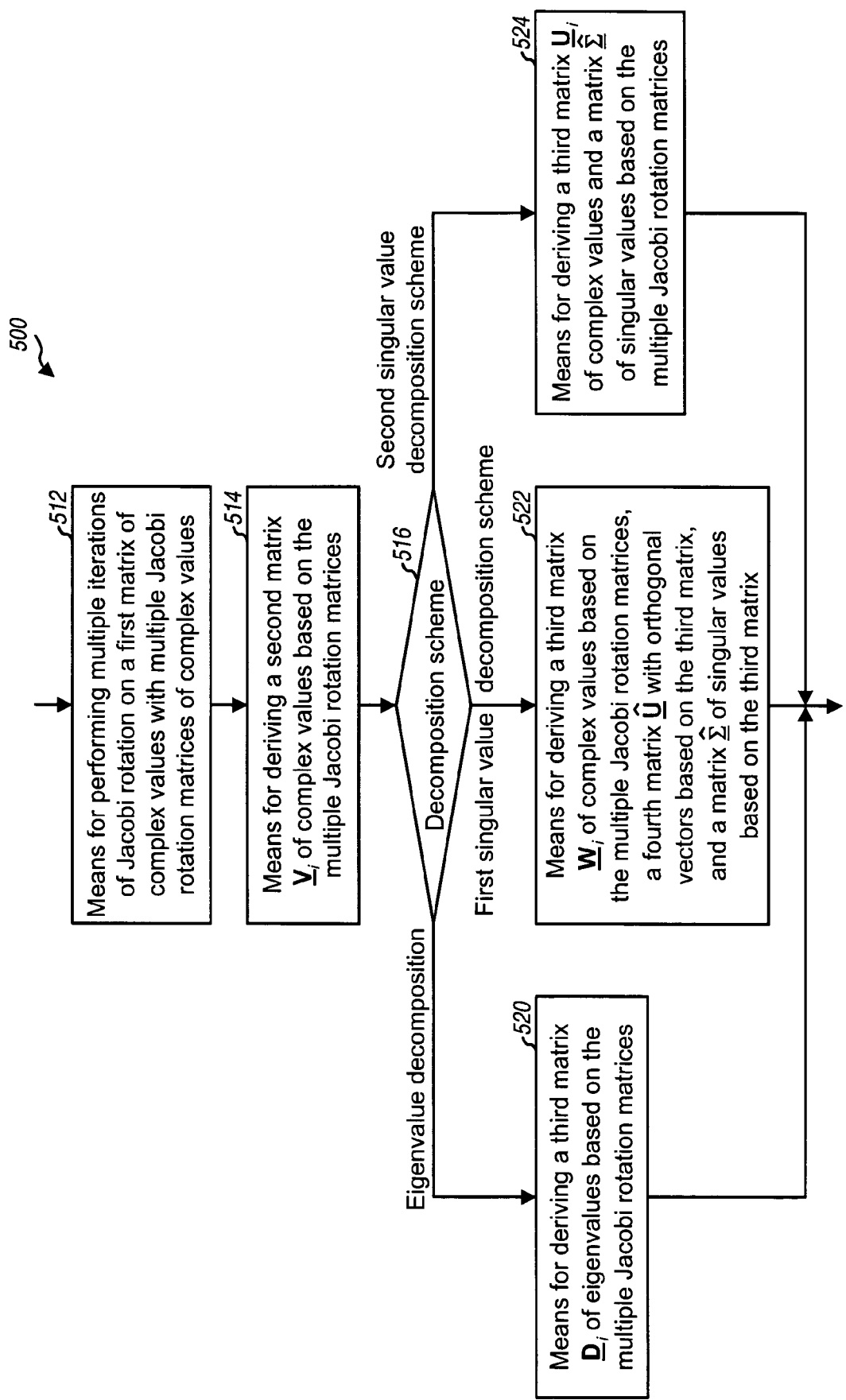
FIG. 5 shows an apparatus for decomposing a matrix using Jacobi rotation.

FIG. 5 shows an apparatus 500 for decomposing a matrix using Jacobi rotation. Apparatus 500 includes means for performing multiple iterations of Jacobi rotation on a first matrix of complex values with multiple Jacobi rotation matrices of complex values (block 512) and means for deriving a second matrix $V_i$ of complex values based on the multiple Jacobi rotation matrices (block 514).

For eigenvalue decomposition, apparatus 500 further includes means for deriving a third matrix $D_i$ of eigenvalues based on the multiple Jacobi rotation matrices (block 520). For singular value decomposition based on the first SVD embodiment, apparatus 500 further includes means for deriving a third matrix $W_i$ of complex values based on the multiple Jacobi rotation matrices, a fourth matrix $\hat{U}$ with orthogonal vectors based on the third matrix, and a matrix $\hat{\Sigma}$ of singular values based on the third matrix (block 522). For singular value decomposition based on the second SVD embodiment, apparatus 500 further includes means for deriving a third matrix $U_i$ with orthogonal vectors and a matrix $\hat{\Sigma}$ of singular values based on the multiple Jacobi rotation matrices (block 524).

3. System

Figure 6:
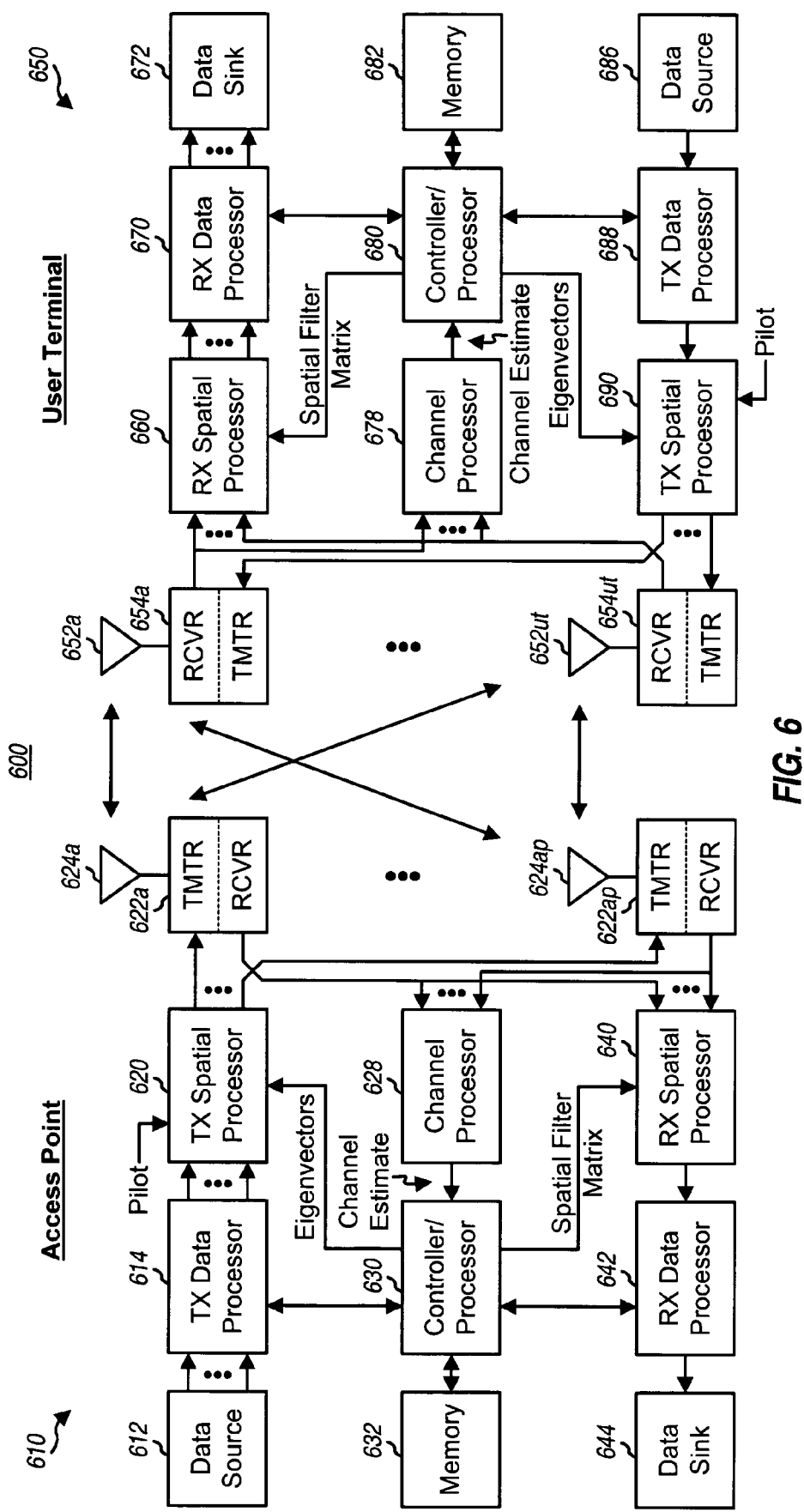
FIG. 6 shows a block diagram of an access point and a user terminal.

FIG. 6 shows a block diagram of an embodiment of an access point 610 and a user terminal 650 in a MIMO system 600. Access point 610 is equipped with multiple ($N_{ap}$) antennas that may be used for data transmission and reception. User terminal 650 is equipped with multiple ($N_{ut}$) antennas that may be used for data transmission and reception. For simplicity, the following description assumes that MIMO system 600 uses time division duplexing (TDD), and the downlink channel response matrix $H_{dn}(k)$ for each subband k is reciprocal of the uplink channel response matrix $H_{up}(k)$ for that subband, or $H_{dn}(k)=H(k)$ and $H_{up}(k)=H^T(k)$.

On the downlink, at access point 610, a transmit (TX) data processor 614 receives traffic data from a data source 612 and other data from a controller/processor 630. TX data processor 614 formats, encodes, interleaves, and modulates the received data and generates data symbols, which are modulation symbols for data. A TX spatial processor 620 receives and multiplexes the data symbols with pilot symbols, performs spatial processing with eigenvectors or right singular vectors if applicable, and provides $N_{ap}$ streams of transmit symbols to $N_{ap}$ transmitters (TMTR) 622a through 622ap. Each transmitter 622 processes its transmit symbol stream and generates a downlink modulated signal. $N_{ap}$ downlink modulated signals from transmitters 622a through 622ap are transmitted from antennas 624a through 624ap, respectively.

At user terminal 650, Nut antennas 652a through 652ut receive the transmitted downlink modulated signals, and each antenna 652 provides a received signal to a respective receiver (RCVR) 654. Each receiver 654 performs processing complementary to the processing performed by transmitters 622 and provides received symbols. A receive (RX) spatial processor 660 performs spatial matched filtering on the received symbols from all receivers 654a through 654ut and provides detected data symbols, which are estimates of the data symbols transmitted by access point 610. An RX data processor 670 further processes (e.g., symbol demaps, deinterleaves, and decodes) the detected data symbols and provides decoded data to a data sink 672 and/or a controller/processor 680.

A channel processor 678 processes received pilot symbols and provides an estimate of the downlink channel response, $\hat{H}(k)$, for each subband of interest. Processor 678 and/or 680 may decompose each matrix $\hat{H}(k)$ using the techniques described herein to obtain $\hat{V}(k)$ and $\hat{\Sigma}(k)$, which are estimates of $V(k)$ and $\Sigma(k)$ for the downlink channel response matrix $H(k)$. Processor 678 and/or 680 may derive a downlink spatial filter matrix $M_{dn}(k)$ for each subband of interest based on $\hat{V}(k)$, as shown in Table 1. Processor 680 may provide $M_{dn}(k)$ to RX spatial processor 660 for downlink matched filtering and/or $\hat{V}(k)$ to a TX spatial processor 690 for uplink spatial processing.

The processing for the uplink may be the same or different from the processing for the downlink. Traffic data from a data source 686 and other data from controller/processor 680 are processed (e.g., encoded, interleaved, and modulated) by a TX data processor 688, multiplexed with pilot symbols, and further spatially processed by a TX spatial processor 690 with $\hat{V}(k)$ for each subband of interest. The transmit symbols from TX spatial processor 690 are further processed by transmitters 654a through 654ut to generate $N_{ut}$ uplink modulated signals, which are transmitted via antennas 652a through 652ut.

At access point 610, the uplink modulated signals are received by antennas 624a through 624ap and processed by receivers 622a through 622ap to generate received symbols for the uplink transmission. An RX spatial processor 640 performs spatial matched filtering on the received data symbols and provides detected data symbols. An RX data processor 642 further processes the detected data symbols and provides decoded data to a data sink 644 and/or controller/processor 630.

A channel processor 628 processes received pilot symbols and provides an estimate of either $H^T(k)$ or $U(k)$ for each subband of interest, depending on the manner in which the uplink pilot is transmitted. Processor 628 and/or 630 may decompose each matrix $\hat{H}^T(k)$ using the techniques described herein to obtain $\hat{U}(k)$. Processor 628 and/or 630 may also derive an uplink spatial filter matrix $M_{up}(k)$ for each subband of interest based on $\hat{U}(k)$. Processor 680 may provide $M_{up}(k)$ to RX spatial processor 640 for uplink spatial matched filtering and/or $\hat{U}(k)$ to TX spatial processor 620 for downlink spatial processing.

Controllers/processors 630 and 680 control the operation at access point 610 and user terminal 650, respectively. Memories 632 and 682 store data and program codes for access point 610 and user terminal 650, respectively. Processors 628, 630, 678, 680 and/or other processors may perform eigenvalue decomposition and/or singular value decomposition of the channel response matrices.

The matrix decomposition techniques described herein may be implemented by various means. For example, these techniques may be implemented in hardware, firmware, software, or a combination thereof. For a hardware implementation, the processing units used to perform matrix decomposition may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a firmware and/or software implementation, the matrix decomposition techniques may be implemented with modules (e.g., procedures, functions, and so on) that perform the functions described herein. The software codes may be stored in a memory (e.g., memory 632 or 682 in FIG. 6 and executed by a processor (e.g., processor 630 or 680). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. An apparatus comprising:
   at least one processor configured
   to perform a plurality of iterations of Jacobi rotation on a first matrix of complex values with a plurality of Jacobi rotation matrices of complex values, wherein the at least one processor is configured, for each iteration, to form a submatrix based on the first matrix, to decompose the submatrix, to obtain eigenvectors for the submatrix, to form a Jacobi rotation matrix with the eigenvectors, and to update the first matrix with the Jacobi rotation matrix, and
   to derive a second matrix of complex values based on the plurality of Jacobi rotation matrices, the second matrix comprising orthogonal vectors; and
   a memory coupled to the at least one processor.

2. The apparatus of claim 1, wherein for each of the plurality of iterations, the at least one processor is configured to order the eigenvectors for the submatrix based on eigenvalues for the submatrix.

3. The apparatus of claim 1, wherein the at least one processor is configured to derive a third matrix of eigenvalues based on the plurality of Jacobi rotation matrices.

4. The apparatus of claim 1, wherein the at least one processor is configured
   to derive a third matrix of complex values based on the plurality of Jacobi rotation matrices; and
   to derive a fourth matrix with orthogonal vectors based on the third matrix.

5. The apparatus of claim 4, wherein the at least one processor is configured to derive a matrix of singular values based on the third matrix.

6. The apparatus of claim 1, wherein the at least one processor is configured to derive a third matrix with orthogonal vectors based on the plurality of Jacobi rotation matrices.

7. The apparatus of claim 6, wherein the at least one processor is configured to derive a matrix of singular values based on the plurality of Jacobi rotation matrices.

8. The apparatus of claim 1, wherein the at least one processor is configured to select different values for row and column indices of the first matrix for the plurality of iterations of the Jacobi rotation.

9. The apparatus of claim 1, wherein for each of the plurality of iterations the at least one processor is configured
to identify a largest off-diagonal element in the first matrix, and
to perform the Jacobi rotation based on the largest off-diagonal element.

10. The apparatus of claim 1, wherein the at least one processor is configured to terminate the Jacobi rotation on the first matrix after a predetermined number of iterations.

11. The apparatus of claim 1, wherein the at least one processor is configured
to determine whether an error criterion is satisfied, and
to terminate the plurality of iterations of the Jacobi rotation upon satisfaction of the error criterion.

12. The apparatus of claim 1, wherein the first matrix has a dimension larger than 2×2.

13. A method comprising:
performing a plurality of iterations of Jacobi rotation on a first matrix of complex values with a plurality of Jacobi rotation matrices of complex values, by a wireless communications apparatus, wherein the performing comprises, for each iteration, forming a submatrix based on the first matrix, decomposing the submatrix to obtain eigenvectors for the submatrix, forming a Jacobi rotation matrix with the eigenvectors, and updating the first matrix with the Jacobi rotation matrix; and
deriving a second matrix of complex values based on the plurality of Jacobi rotation matrices, the second matrix comprising orthogonal vectors.

14. The method of claim 13, further comprising:
deriving a third matrix of complex values based on the plurality of Jacobi rotation matrices; and
deriving a fourth matrix with orthogonal vectors based on the third matrix.

15. The method of claim 13, further comprising:
deriving a third matrix with orthogonal vectors based on the plurality of Jacobi rotation matrices.

16. An apparatus for wireless communications comprising:
means for performing a plurality of iterations of Jacobi rotation on a first matrix of complex values with a plurality of Jacobi rotation matrices of complex values, wherein the means for performing is configured to, for each iteration, form a submatrix based on the first matrix, decompose the submatrix to obtain eigenvectors for the submatrix, form a Jacobi rotation matrix with the eigenvectors, and update the first matrix with the Jacobi rotation matrix; and
means for deriving a second matrix of complex values based on the plurality of Jacobi rotation matrices, the second matrix comprising orthogonal vectors.

17. The apparatus of claim 16, further comprising:
means for deriving a third matrix of complex values based on the plurality of Jacobi rotation matrices; and
means for deriving a fourth matrix with orthogonal vectors based on the third matrix.

18. The apparatus of claim 16, further comprising:
means for deriving a third matrix with orthogonal vectors based on the plurality of Jacobi rotation matrices.

19. An apparatus comprising:
at least one processor configured
to initialize a first matrix to an identity matrix,
to initialize a second matrix to a Hermitian matrix of complex values,
to perform a plurality of iterations of Jacobi rotation on the second matrix by forming a submatrix for each iteration based on the second matrix, decomposing the submatrix to obtain eigenvectors for the submatrix for each iteration, forming, with the eigenvectors for the submatrix, a Jacobi rotation matrix of complex values for each iteration, and updating the first and second matrices for each iteration based on the Jacobi rotation matrix for the iteration,
to provide the first matrix as a matrix of eigenvectors, and
to provide the second matrix as a matrix of eigenvalues; and
a memory coupled to the at least one processor.

20. An apparatus for wireless communications comprising:
means for initializing a first matrix to an identity matrix;
means for initializing a second matrix to a Hermitian matrix of complex values;
means for performing a plurality of iterations of Jacobi rotation on the second matrix, by, for each iteration, forming a submatrix based on the second matrix, decomposing the submatrix to obtain eigenvectors for the submatrix, forming a Jacobi rotation matrix with the eigenvectors, and updating the first and second matrices based on the Jacobi rotation matrix for the iteration;
means for providing the first matrix as a matrix of eigenvectors; and
means for providing the second matrix as a matrix of eigenvalues.

21. An apparatus comprising:
at least one processor is configured
to initialize a first matrix to an identity matrix,
to initialize a second matrix to a matrix of complex values,
to perform a plurality of iterations of Jacobi rotation on the second matrix by, for each iteration, forming a submatrix based on the second matrix, decomposing the submatrix to obtain eigenvectors for the submatrix, forming, with the eigenvectors for the submatrix, a Jacobi rotation matrix, and updating the first and second matrices based on the Jacobi rotation matrix for the iteration, and
to provide the first matrix as a matrix of right singular vectors; and
a memory coupled to the at least one processor.

22. The apparatus of claim 21, wherein the at least one processor is configured to derive a matrix of singular values based on the second matrix.

23. The apparatus of claim 21, wherein the at least one processor is configured to derive a matrix of left singular vectors based on second matrix.

24. An apparatus for wireless communications, comprising:
means for initializing a first matrix to an identity matrix;
means for initializing a second matrix to a matrix of complex values;
means for performing a plurality of iterations of Jacobi rotation on the second matrix by, for each iteration, forming a submatrix based on the second matrix, decomposing the submatrix to obtain eigenvectors for the submatrix, forming a Jacobi rotation matrix with the eigenvectors, and updating the first and second matrices based on the Jacobi rotation matrix for the iteration; and
means for provide the first matrix as a matrix of right singular vectors.

25. An apparatus comprising:
at least one processor is configured
to initialize a first matrix to an identity matrix,
to initialize a second matrix to the identity matrix, to initialize a third matrix to a matrix of complex values, to perform a plurality of iterations of Jacobi rotation on the third matrix by, for each iteration, forming a first submatrix based on the third matrix, decomposing the first submatrix to obtain eigenvectors for the first submatrix, forming a first Jacobi rotation matrix with the eigenvectors for the first submatrix, forming a second Jacobi rotation matrix based on the third matrix, updating the first matrix based on the first Jacobi rotation matrix, updating the second matrix based on the second Jacobi rotation matrix, and updating the third matrix based on the first and second Jacobi rotation matrices, and to provide the second matrix as a matrix of left singular vectors; and a memory coupled to the at least one processor.

26. The apparatus of claim 25, wherein for each of the plurality of iterations the at least one processor is configured to form a second submatrix based on the third matrix, to decompose the second submatrix to obtain eigenvectors for the second submatrix, and to form the second Jacobi rotation matrix with the eigenvectors for the second submatrix.

27. The apparatus of claim 25, wherein the at least one processor is configured to derive a matrix of right singular vectors based on the first matrix.

28. The apparatus of claim 25, wherein the at least one processor is configured to derive a matrix of singular values based on the third matrix.

29. An apparatus for wireless communications, comprising:

means for initializing a first matrix to an identity matrix;

means for initializing a second matrix to the identity matrix;

means for initializing a third matrix to a matrix of complex values, means for performing a plurality of iterations of Jacobi rotation on the third matrix by, for each iteration, forming a first submatrix based on the third matrix, decomposing the first submatrix to obtain eigenvectors for the first submatrix, forming a first Jacobi rotation matrix with the eigenvectors for the first submatrix, forming a second Jacobi rotation matrix based on the third matrix, updating the first matrix based on the first Jacobi rotation matrix, updating the second matrix based on the second Jacobi rotation matrix, and updating the third matrix based on the first and second Jacobi rotation matrices; and means for providing the second matrix as a matrix of left singular vectors.

30. The apparatus of claim 29 wherein the means for forming the second Jacobi rotation matrix comprises means for forming a second submatrix based on the third matrix, means for decomposing the second submatrix to obtain eigenvectors for the second submatrix, and means for forming the second Jacobi rotation matrix with the eigenvectors for the second submatrix.

31. An apparatus comprising:

at least one processor is configured to perform a first plurality of iterations of Jacobi rotation on a first matrix of complex values to obtain a first unitary matrix with orthogonal vectors, and to perform a second plurality of iterations of the Jacobi rotation on a second matrix of complex values to obtain a second unitary matrix with orthogonal vectors, wherein the first unitary matrix is used as an initial solution for the second unitary matrix; and a memory coupled to the at least one processor.

32. The apparatus of claim 31, wherein the at least one processor is configured to perform a third plurality of iterations of the Jacobi rotation on a third matrix of complex values to obtain a third unitary matrix with orthogonal vectors, wherein the second unitary matrix is used as an initial solution for the third unitary matrix.

33. The apparatus of claim 31, wherein the first and second matrices of complex values are channel response matrices for two frequency subbands.

34. The apparatus of claim 31, wherein the first and second matrices of complex values are channel response matrices for two time intervals.

35. An apparatus for wireless communications, comprising:

means for performing a first plurality of iterations of Jacobi rotation on a first matrix of complex values to obtain a first unitary matrix with orthogonal vectors; and means for performing a second plurality of iterations of the Jacobi rotation on a second matrix of complex values to obtain a second unitary matrix with orthogonal vectors, wherein the first unitary matrix is used as an initial solution for the second unitary matrix.

36. The apparatus of claim 35, wherein the first and second matrices of complex values are channel response matrices for two frequency subbands.

* * * * *